(12) United States Patent
Kim et al.

(10) Patent No.: US 10,551,971 B2
(45) Date of Patent: Feb. 4, 2020

(54) IMAGE FORMING APPARATUS, TOUCH INPUT APPARATUS, AND METHOD OF PREVENTING TOUCH ERROR

(71) Applicant: HEWLETT-PACKARD DEVELOPMENT COMPANY, L.P., Spring, TX (US)

(72) Inventors: Jin-sil Kim, Suwon-si (KR); Han-sang Oh, Seoul (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/780,513

(22) PCT Filed: Jan. 23, 2017

(86) PCT No.: PCT/KR2017/000757
§ 371 (c)(1),
(2) Date: May 31, 2018

(87) PCT Pub. No.: WO2017/150806
PCT Pub. Date: Sep. 8, 2017

(65) Prior Publication Data
US 2018/0356939 A1    Dec. 13, 2018

(30) Foreign Application Priority Data

Feb. 29, 2016 (KR) .......................... 10-2016-0024664

(51) Int. Cl.
G06F 3/042    (2006.01)
G06F 3/041    (2006.01)
H04N 1/00    (2006.01)

(52) U.S. Cl.
CPC .......... *G06F 3/0421* (2013.01); *G06F 3/0418* (2013.01); *H04N 1/00411* (2013.01); *G06F 2203/04109* (2013.01)

(58) Field of Classification Search
CPC ................. G06F 3/0418; G06F 3/0421; G06F 2203/04109; H04N 1/00411
See application file for complete search history.

(56) References Cited

U.S. PATENT DOCUMENTS

2006/0114244 A1    6/2006    Saxena et al.
2010/0066704 A1    3/2010    Kasai
(Continued)

FOREIGN PATENT DOCUMENTS

WO    WO-2014197404 A2    12/2014

*Primary Examiner* — Laurence J Lee
(74) *Attorney, Agent, or Firm* — Jefferson IP Law, LLP

(57) ABSTRACT

An example image forming apparatus includes a light emitter to emit a plurality of light beams in a first direction perpendicular to a light emitting direction of a display and a second direction perpendicular to the first direction and the light emitting direction, a light receiver, a first processor to determine a touch input coordinate of a user based on a variation amount of each of the plurality of light beams received by the receiver, and a second processor to control the display and the image former using the determined touch input coordinate. The first processor may suspend determination of the touch input coordinate in response to an optical change being detected only in one direction within a preset first time. The example image forming apparatus may prevent a touch error, such as a touch error due to frustrated total internal reflection.

15 Claims, 11 Drawing Sheets

(56) References Cited

U.S. PATENT DOCUMENTS

| | | |
|---|---|---|
| 2010/0134447 A1 | 6/2010 | Nakajoh |
| 2011/0148820 A1 | 6/2011 | Song |
| 2011/0242030 A1* | 10/2011 | Ise .................. G06F 3/0416 345/173 |
| 2013/0100037 A1 | 4/2013 | Mabie et al. |
| 2014/0292701 A1 | 10/2014 | Christiansson et al. |
| 2015/0103051 A1 | 4/2015 | Wyrwas et al. |

* cited by examiner

[Fig. 1]
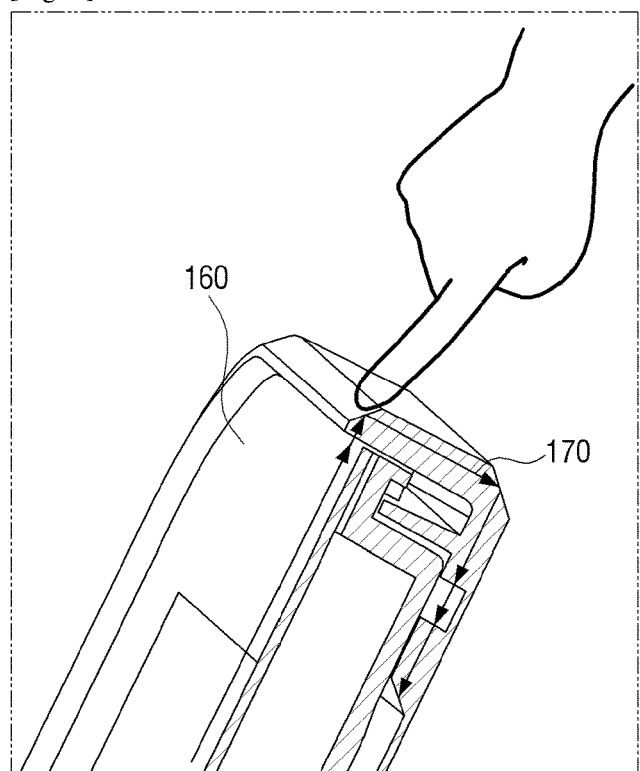
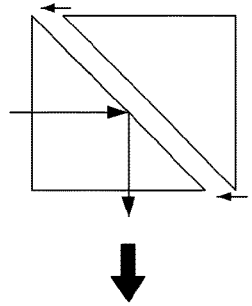
Total internal reflection
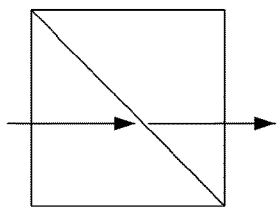
Frustrated total internal reflection
[Fig. 2]
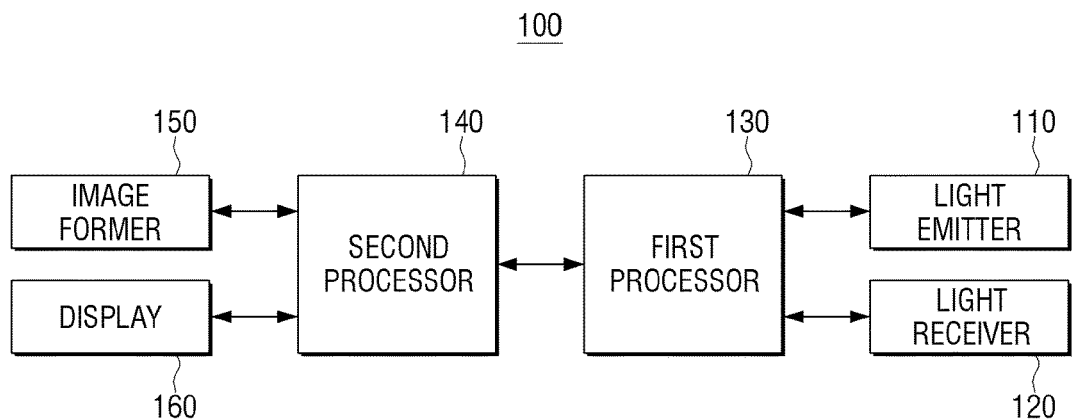
[Fig. 3]
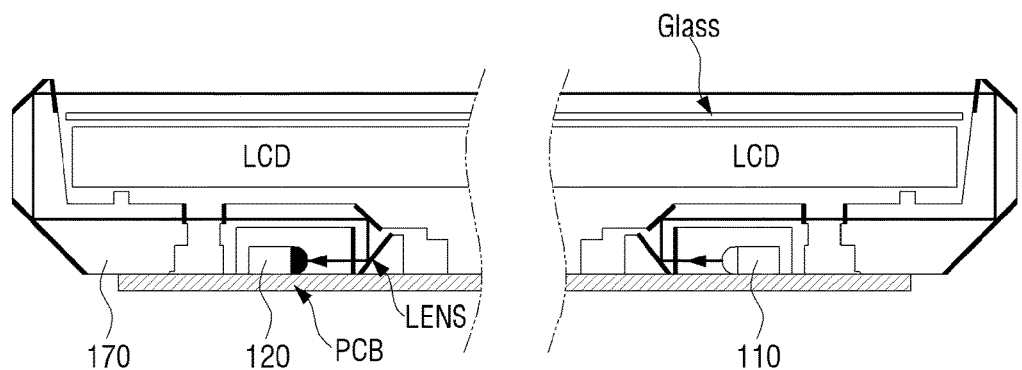

[Fig. 4]
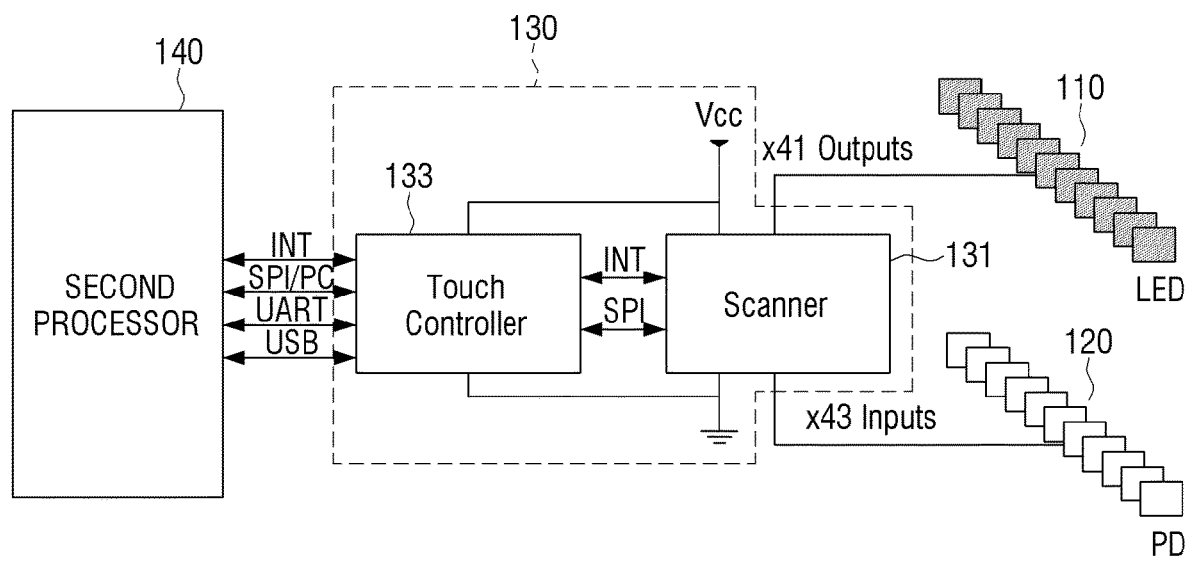

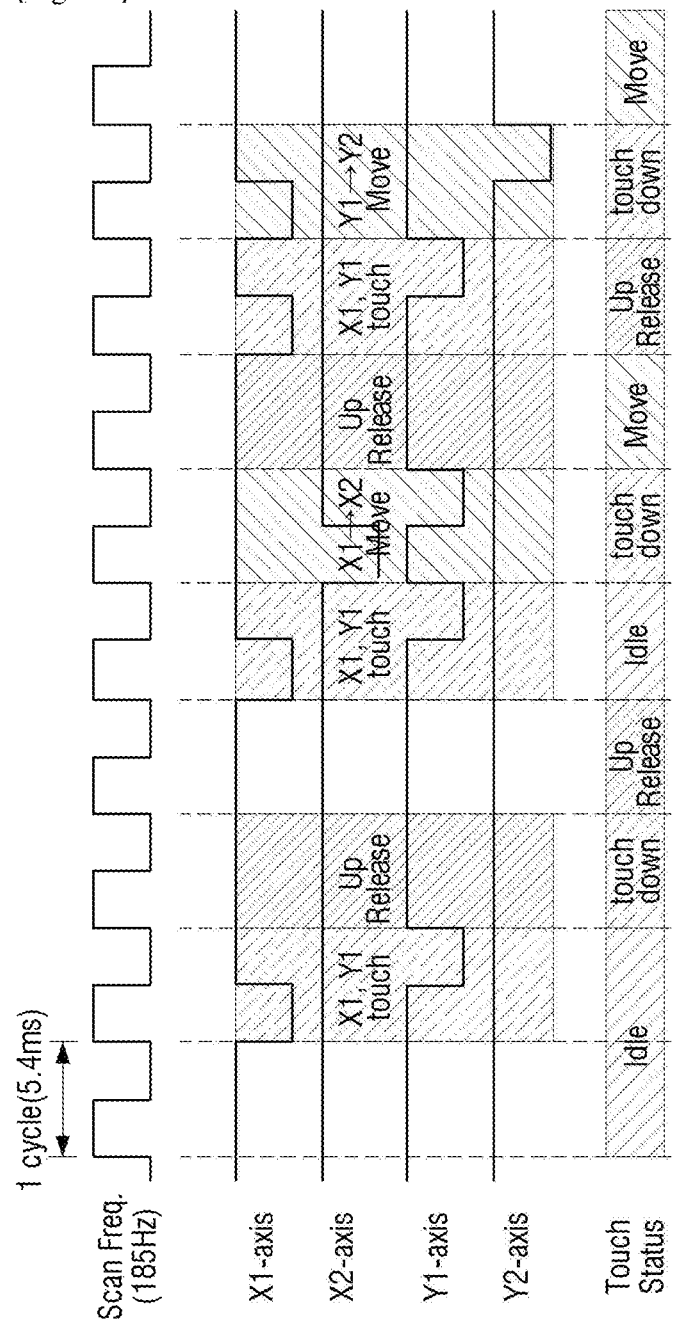
[Fig. 5A]

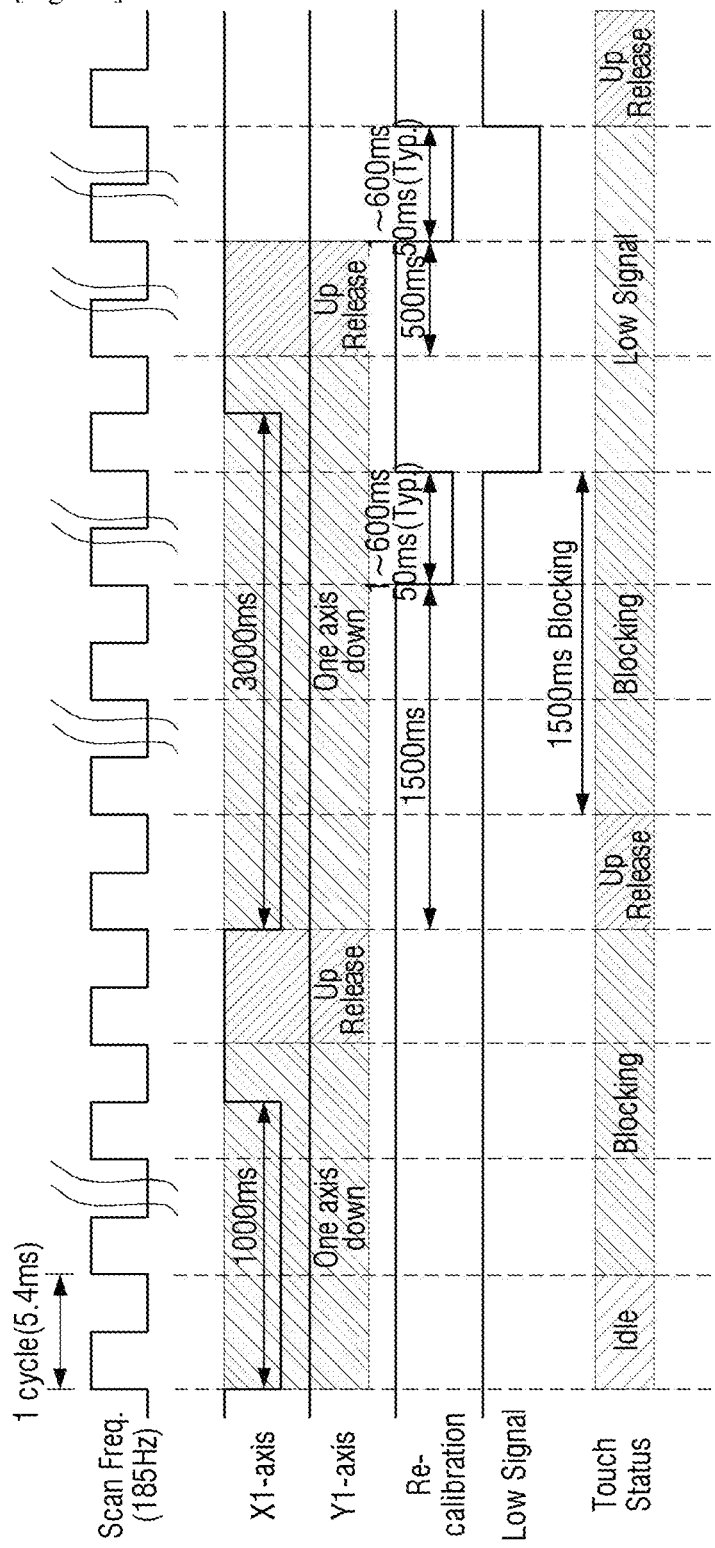
[Fig. 5B]

[Fig. 5C]
160
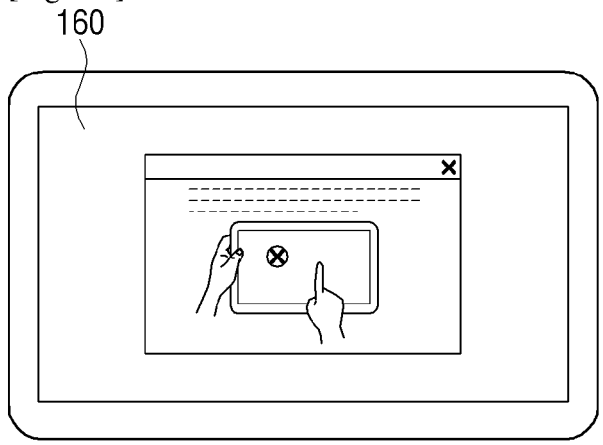
[Fig. 6A]
160
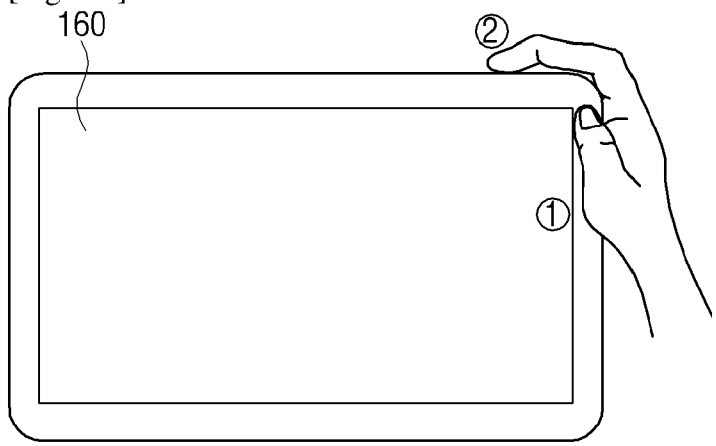
[Fig. 6B]
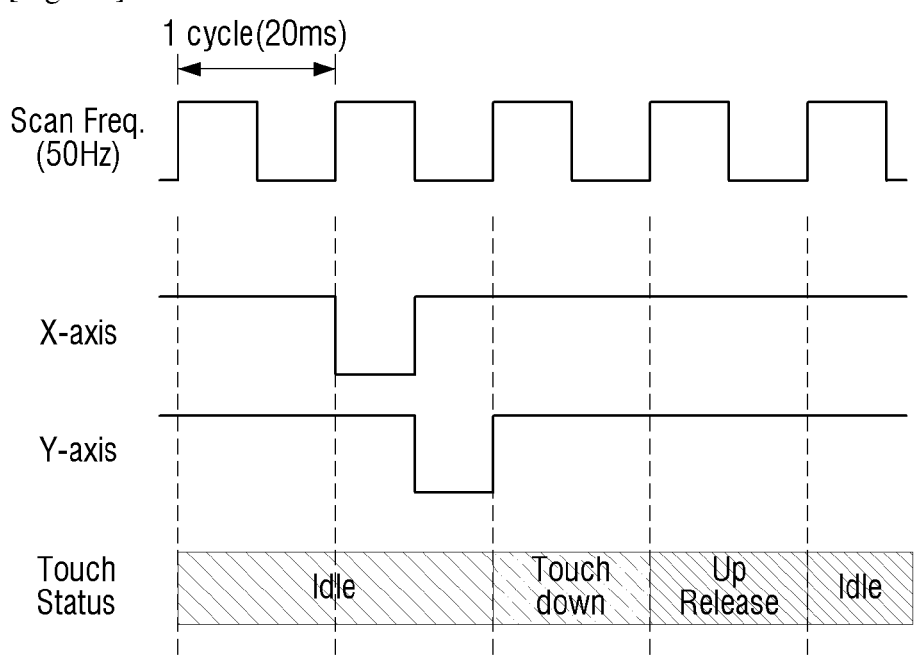

[Fig. 6C]
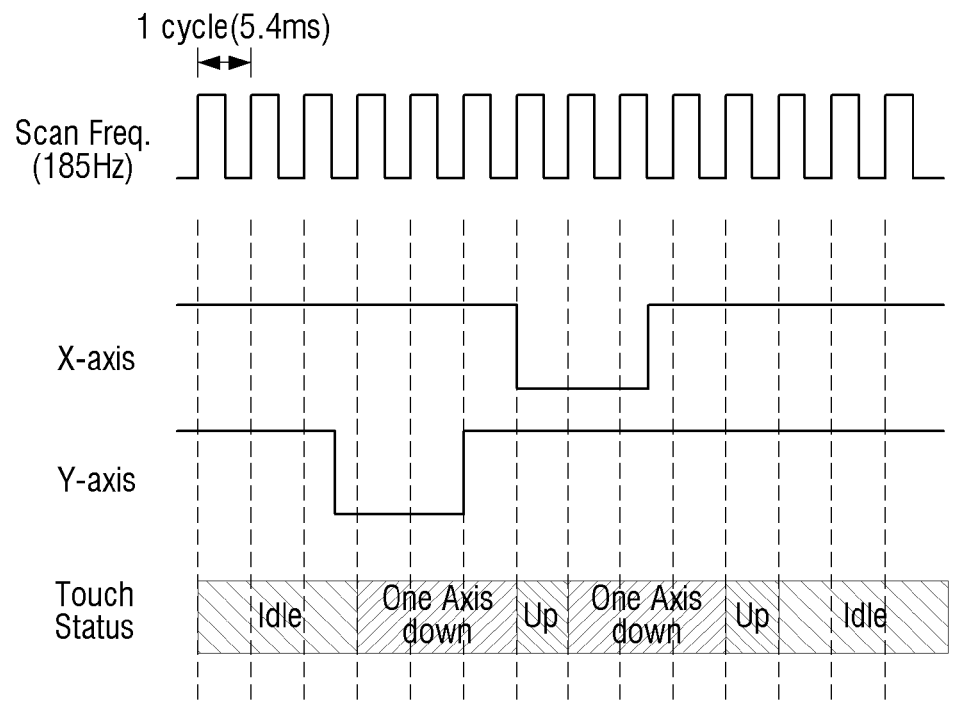
[Fig. 7]
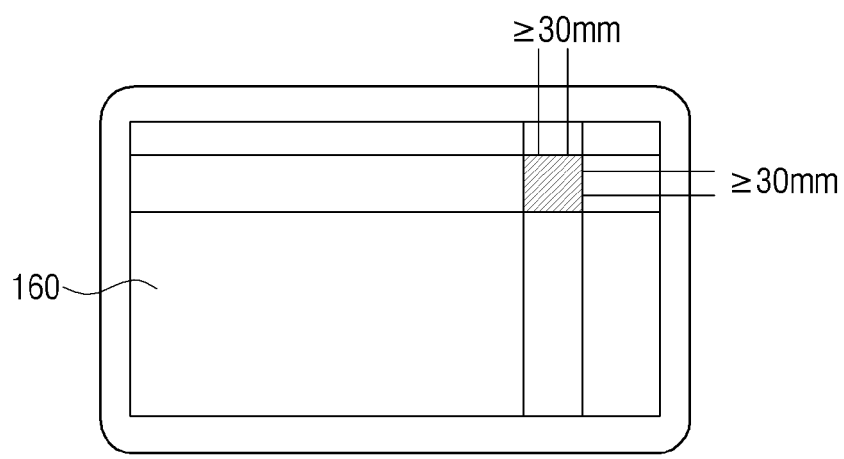

[Fig. 8A]
VOLTAGE LEVEL
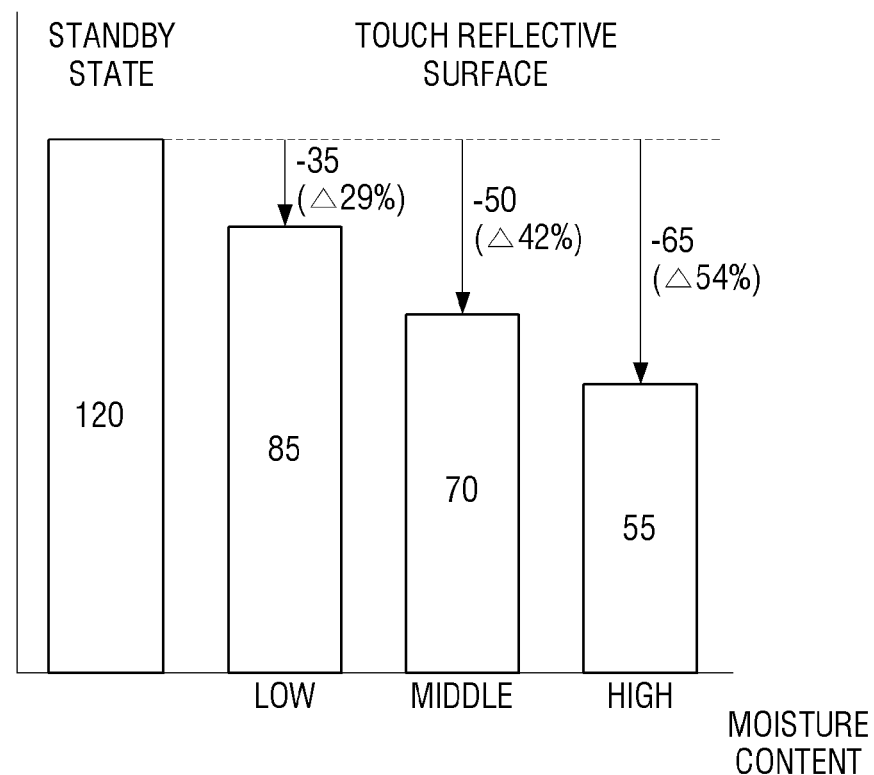
[Fig. 8B]
| Sensitivity | Min. Object size |
|---|---|
| △20% | 3mm |
| △30% | 4mm |
| △40% | 5mm |
| △50% | 6mm |
| △60% | 7mm |
| △70% | 8mm |
| △75% | 8mm |
| △80% | 9mm |

[Fig. 8C]
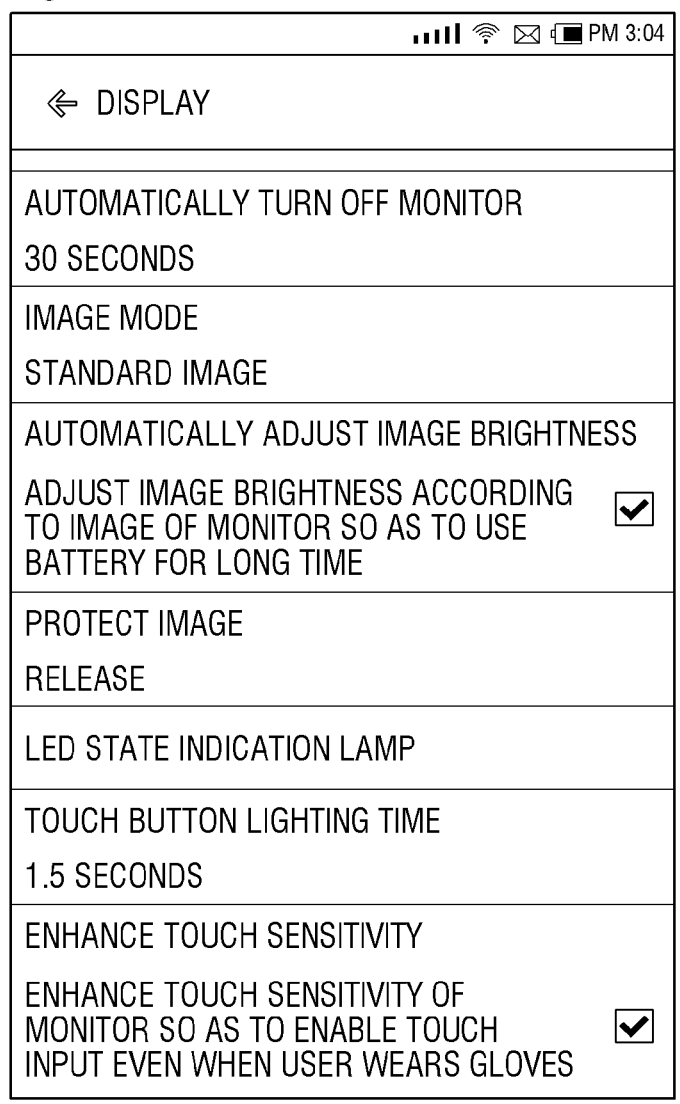

[Fig. 8D]
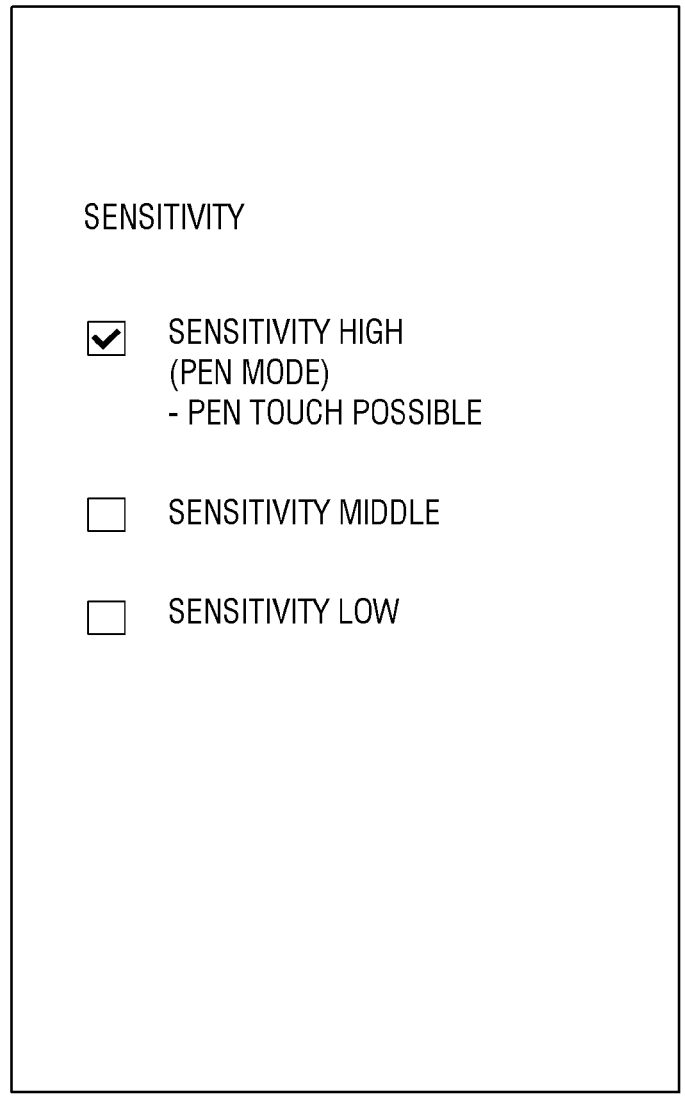
[Fig. 9A]
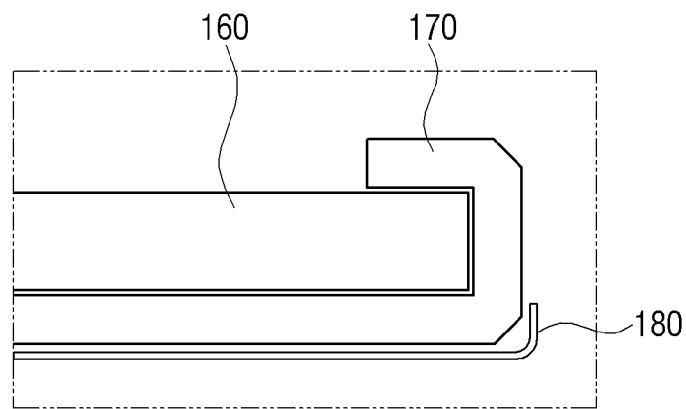

[Fig. 9B]
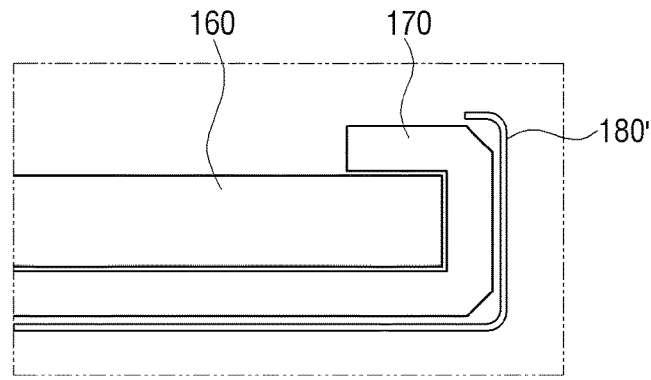
[Fig. 10]
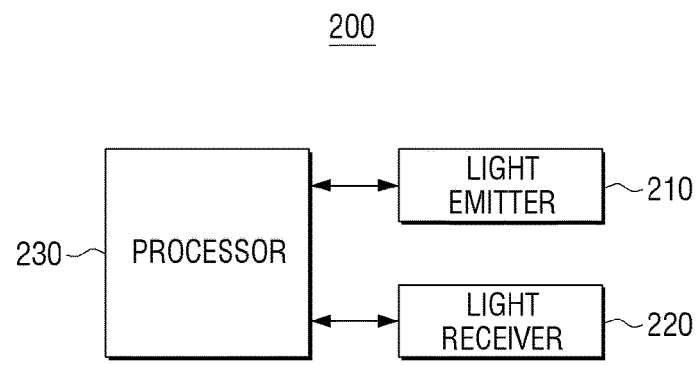
[Fig. 11]
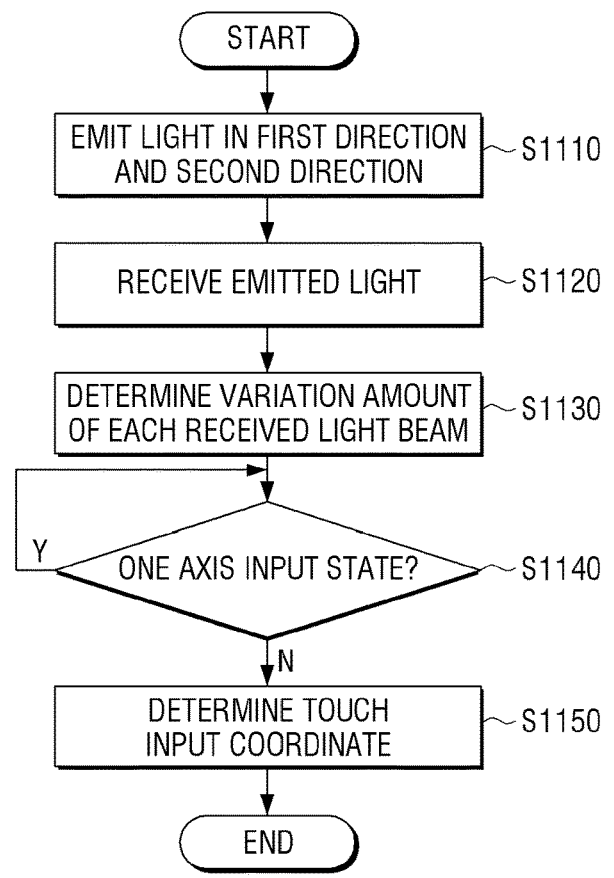

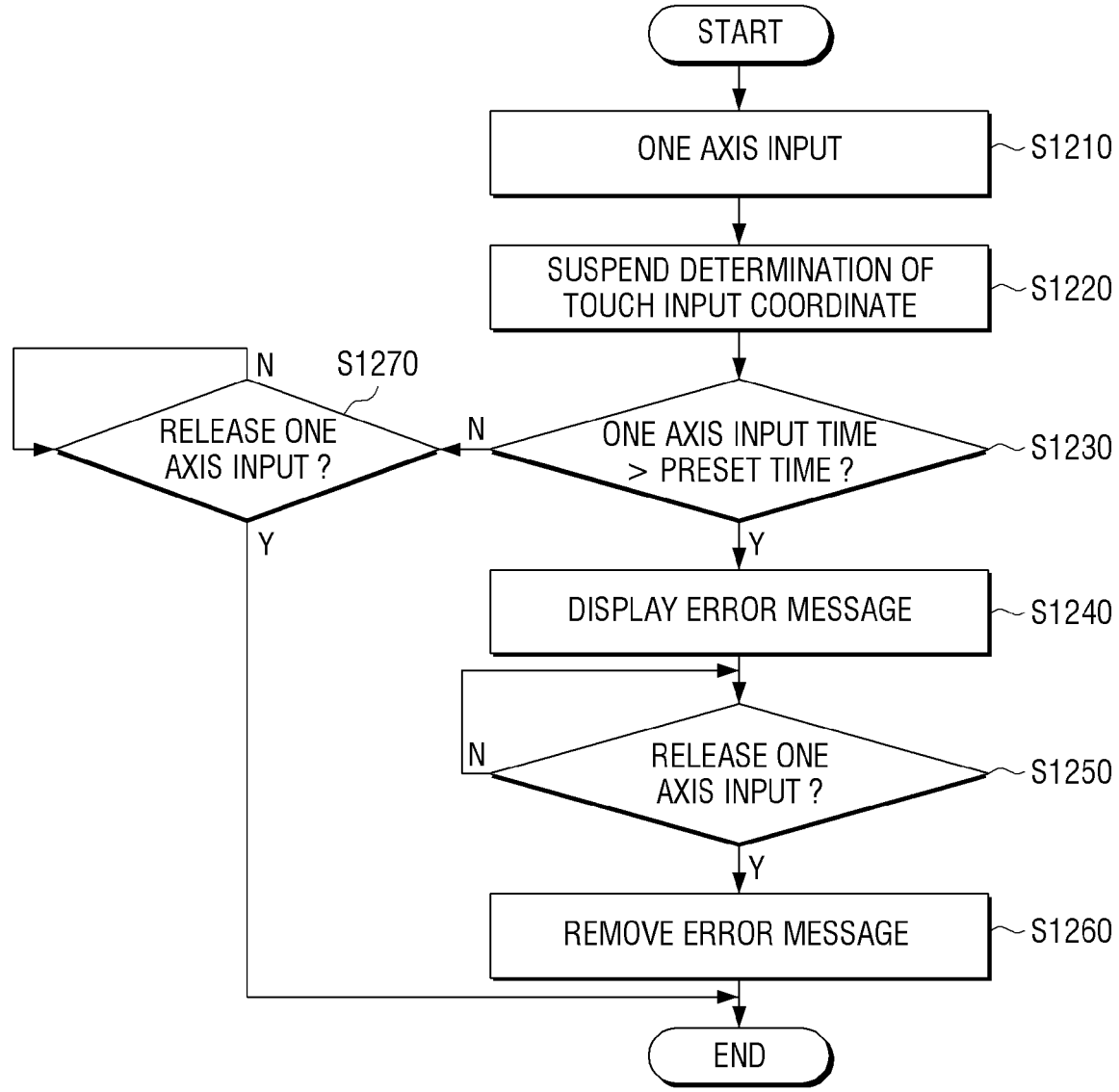
[Fig. 12]

IMAGE FORMING APPARATUS, TOUCH INPUT APPARATUS, AND METHOD OF PREVENTING TOUCH ERROR

TECHNICAL FIELD

Apparatuses and methods consistent with the present disclosure relate to an image forming apparatus, a touch input apparatus, and a method of preventing touch error, and more particularly, to an image forming apparatus, a touch input apparatus, and a method of preventing touch error, for preventing a touch malfunction due to touch on a reflective surface of a light guider.

BACKGROUND ART

Touch screen panel (TSP) technology is embodied in various methods such as a resistive layer method, a capacitive method, and an infrared method. Thereamong, in the infrared method, a light emitting diode (LED) array and a pair of photodetector (PD) arrays are arranged outside a touch panel. Light emitted from the LED is hidden by a finger and so on when there is a touch input and, thus, coordinates when the light emitted from the LED is not detected by a PD may be calculated and a touch input may be detected.

The infrared method advantageously uses diversified touch elements such as a glove, a pen, and a stylus as well as a finger unlike in the capacitive method and so on. In addition, patterning is not necessarily performed on a touch panel glass and, thus, durability may be advantageously enhanced.

Recently, a structure configured to dispose a light emitter for emitting infrared rays and a light receiver for receiving emitted light at a lower surface of a panel to minimize a bezel portion has been widely used. In this case, light emitted from a lower surface of the panel may be emitted to an upper end of the panel using a light guide.

However, when light is emitted through the light guide, if a reflective surface of the light guide is smeared with water due to a finger touch and so on, frustrated total internal reflection (FTIR) but not total internal reflection (TIR) occurs.

DISCLOSURE OF INVENTION

Technical Problem

There is a problem in that a touch is determined to be performed as intensity of light received by a PD is reduced.

When an exterior light guide is used, an unintended touch due to a user touch of an edge portion may occur and there is an increasing to prevent a touch malfunction.

Solution to Problem

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides an image forming apparatus, a touch input apparatus, and a method of preventing touch error, for preventing touch error due to frustrated total internal reflection.

According to an aspect of the present disclosure, an image forming apparatus includes an image former, a display configured to display a user interface (UI) for controlling the image former, a light emitter configured to emit a plurality of light beams in a first direction perpendicular to a light emitting direction of the display and a second direction perpendicular to the first direction and the light emitting direction, a light receiver configured to receive the plurality of light beams emitted from the light emitter, a first processor configured to determine a touch input coordinate of a user based on a variation amount of each of the plurality of light beams received by the receiver, and a second processor configured to control the display and the image former using the determined touch input coordinate, wherein the first processor suspends determination of a touch input coordinate in response to optical change being detected only in one direction within a preset first time.

The first processor may determine a touch input coordinate in response to change in light emitted in a different direction within the preset first time being detected while change in light emitted in one direction is detected and suspend determination of a touch input coordinate in response to change in light emitted in the different direction being detected after the preset first time.

The first processor may maintain suspension of determination of a touch input coordinate despite detection of change in light emitted in a different direction from one direction in which the optical change is detected before a preset second time elapses while determination of a touch input coordinate is suspended.

The first processor may notify the second processor of a one axis input state in response to optical change being detected only in one direction within the preset first time.

The second processor may control the display to display an error message when the detected optical change in one direction is maintained until a preset third time elapses after being notified of the one axis input state.

The light receiver may include a plurality of first sensors configured to receive light emitted in the first direction, and a plurality of second sensors configured to receive light emitted in the second direction.

The first processor may detect a sensor with a variation amount of a received light value of a preset level or more as a sensor for detecting the touch input among the plurality of first sensors and the plurality of second sensors and determine a touch input coordinate of the user based on an arrangement position of the detected sensor.

The first processor may suspend determination of a touch input coordinate when a size of a range detected as a touch region deviates from a preset size range.

The second processor may control the display to display a UI for setting a value corresponding to a lower limit value of the preset size range.

The image forming apparatus may further include a light guider disposed on a lateral surface of the display, wherein the light emitter may be disposed below the display and emit light, the light receiver may be disposed below the display and receive light, and the light guider may receive light emitted from the light emitter, emit the light to an upper portion of the display, receive the emitted light to the upper portion of the display, and emit the light to the light receiver.

The light guider may include a plurality of reflective surfaces for changing an optical path so as to emit the light emitted from the light emitter in the first direction and the second direction.

The image forming apparatus may further include a cover portion configured to cover at least one external portion of the plurality of reflective surfaces, wherein the cover portion may be spaced apart from at least one of the plurality of reflective surfaces.

The cover portion may include a material with lower density than a material of the light guider.

According to another aspect of the present disclosure, a touch input apparatus includes a light emitter configured to emit a plurality of light beams in a preset first direction and a second direction perpendicular to the first direction, a light receiver configured to receive the light emitted from the light emitter, and a processor configured to determine a touch input coordinate of a user based on a variation amount of each of the plurality of light beams received by the light receiver, wherein the processor determines a touch input coordinate in response to change in light emitted in the first direction and the second direction being detected within a preset first time and suspends determination of a touch input coordinate in response to optical change being detected only in one direction within the preset first time.

The processor may maintain suspension of determination of a touch input coordinate despite detection of change in light emitted in a different direction from one direction in which the optical change is detected before a preset second time elapses while determination of a touch input coordinate is suspended.

According to another aspect of the present disclosure, a method of preventing touch error includes emitting a plurality of light beams in a first direction perpendicular to a light emitting direction of a display and a second direction perpendicular to the first direction and the light emitting direction, receiving the emitted light, and determining a touch input coordinate of a user based on a variation amount of each of the plurality of received light beams, the determining includes determining the touch input coordinate in response to change in light emitted in the first direction and the second direction being detected within a preset first time and suspends determination of a touch input coordinate in response to optical change being detected only in one direction within the preset first time.

The determining may include maintaining suspension of determination of a touch input coordinate despite detection of change in light emitted in a different direction from one direction in which the optical change is detected before a preset second time elapses while determination of a touch input coordinate is suspended.

The method may further include displaying an error message when the detected optical change in one direction is maintained until a preset third time elapses while determination of a touch input coordinate is suspended.

The determining may include comparing a size of a range detected as a touch region with a preset size range, and determining a touch input coordinate when the size is within the preset size range and suspending determination of a touch input coordinate when the size deviates from the preset size range.

The method may further include displaying a user interface (UI) for setting a value corresponding to a lower limit value of the preset size range.

Advantageous Effects of Invention

According to the diverse exemplary embodiments of the present disclosure, a touch malfunction that is caused by touching a reflective surface of a light guider may be prevented.

Additional and/or other aspects and advantages of the invention will be set forth in part in the description which follows and, in part, will be obvious from the description, or may be learned by practice of the invention.

BRIEF DESCRIPTION OF DRAWINGS

The above and/or other aspects of the present disclosure will be more apparent by describing certain exemplary embodiments of the present disclosure with reference to the accompanying drawings, in which:

FIG. 1 is a diagram for explanation of a concept of a touch malfunction according to an exemplary embodiment of the present disclosure;

FIG. 2 is a block diagram for explanation of components of an image forming apparatus according to an exemplary embodiment of the present disclosure;

FIGS. 3 and 4 are diagrams illustrating components of image forming apparatus in terms of components related to a touch input, according to an exemplary embodiment of the present disclosure;

FIGS. 5A to 5C are diagrams for explanation of a method of preventing a touch malfunction according to an exemplary embodiment of the present disclosure;

FIGS. 6A to 6C are diagrams for explanation of a method of preventing a touch malfunction according to another exemplary embodiment of the present disclosure;

FIG. 7 is a diagram for explanation of a restriction of a maximum size of an object according to an exemplary embodiment of the present disclosure;

FIGS. 8A to 8D are diagrams for explanation of restriction of a minimum size of an object according to an exemplary embodiment of the present disclosure;

FIGS. 9A and 9B are diagrams for explanation of a shape of a cover portion according to diverse exemplary embodiments of the present disclosure;

FIG. 10 is a diagram for explanation of components of a touch input apparatus according to an exemplary embodiment of the present disclosure; and FIGS. 11 and 12 are flowcharts for explanation of a method of preventing touch error according to diverse exemplary embodiments of the present disclosure.

MODE FOR THE INVENTION

Certain exemplary embodiments of the present disclosure will now be described in greater detail with reference to the accompanying drawings. In the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure. As used herein, the term "and/or" includes any and all combinations of one or more of the associated listed items.

The terms used herein are for the purpose of describing particular embodiments only and are not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, numbers, steps, operations, elements, components, and/or groups thereof, but do not preclude the presence or addition of one or more other features, numbers, steps, operations, elements, components, and/or groups thereof.

FIG. 1 is a diagram for explanation of a concept of a touch malfunction according to an exemplary embodiment of the present disclosure. An image forming apparatus according to an exemplary embodiment of the present disclosure may use an exterior light guider 170. When the exterior light guider 170 is used, a light emitter 110 and a light receiver 120 may be disposed at a lower end of a display 160 so as to reduce a thickness of a touch panel. As illustrated in FIG. 1, when a user hand touches a reflective surface of the light guider 170, frustrated total internal reflection (FTIR) may occur at a reflective surface on which total internal reflection (TIR) needs to be performed.

In the case of TIR illustrated in an upper-right portion of FIG. 1, incident light is totally reflected off a reflective surface and thus there is no light loss, whereas, in the case of FTIR illustrated in a lower-right portion of FIG. 1, light is not reflected off a reflective surface and externally leaks. This is because reflective indexes 'n' of the light guider 170 and moisture are similar. For example, in general, a reflective index of a light guide for guiding infrared light is 1.586 and a reflective index of water is 1.333.

As such, when FTIR occurs on a reflective surface of the light guider 170, an amount of light received by the light receiver 120 may be reduced. Accordingly, the case of FTIR is determined in the same way as in the case in which a user performs a user input to reduce an amount of received light and, thus, a touch malfunction may occur.

Even if a touch is not performed on the reflective surface of the light guider 170, when emitted light is hidden by a user hand without a touch intention, a touch malfunction may also occur.

Various exemplary embodiments of the present disclosure may provide the image forming apparatus 100, a touch input apparatus 200, and a method of preventing touch error, for identifying a touch malfunction to prevent a touch input that is not associated with a user intention. Hereinafter, details for achieving this objective will be described.

FIG. 2 is a block diagram for explanation of components of the image forming apparatus 100 according to an exemplary embodiment of the present disclosure. Referring to FIG. 2, the image forming apparatus 100 may include the light emitter 110, the light receiver 120, a first processor 130, a second processor 140, an image former 150, and the display 160. The image forming apparatus 100 may further include other components including the light guider 170 and a cover portion 180. According to another exemplary embodiment of the present disclosure, the image forming apparatus 100 may be embodied in the form of a display apparatus (not shown) without the image former 150. In addition, when the image forming apparatus 100 is embodied as a display apparatus (not shown), the image forming apparatus 100 may be coupled to or separated from the image former 150 through a hinge portion (not shown) or the like.

The light emitter 110 may generate light emitted along a surface position in parallel to an upper surface of the display 160. That is, the light emitter 110 may emit light in a direction perpendicular to a light-emitting direction (normal direction) in which the display 160 emits light. The light emitter 110 may include a plurality of light emitting devices. For example, the light emitter 110 may include a plurality of LED arrays.

The plurality of light emitting devices may be arranged along one side of an edge in a horizontal direction of the display 160 and one side of an edge in a vertical direction of the display 160. The light emitter 110 may include a horizontal light emitter including a plurality of light emitting devices at one side (i.e., one of an upper end and a lower end of an edge of the display 160) of an edge in a horizontal direction (X-axis direction) of the display 160 and a vertical light emitter including a plurality of light emitting devices at one side (i.e., one of a left end and a right end of an edge of the display 160) of an edge in a vertical direction (Y-axis direction) of the display 160. Accordingly, the light emitter 110 may emit a plurality of light beams in two perpendicular directions. For example, the light emitter 110 may emit light in a first direction perpendicular to a light-emitting direction in which the display 160 emits light and a second direction perpendicular to the light-emitting direction and the first direction.

The light receiver 120 may receive the plurality of light beams emitted from the light emitter 110. The light receiver 120 may include a plurality of light receiving devices. For example, the light receiver 120 may include a plurality of photodetector (PD) arrays.

The plurality of light receiving devices may be arranged along one side of an edge in a horizontal direction of the display 160 and one side of an edge in a vertical direction of the display 160 so as to correspond to the arrangement of the plurality of light emitting devices. The light receiver 120 may include a horizontal light receiver and a vertical light receiver that each include a plurality of light receiving devices so as to correspond to the light emitter 110. Accordingly, the light receiver 120 may receive a plurality of light beams emitted from the light emitter 110 in two perpendicular directions.

The first processor 130 may determine a user touch input coordinate based on a variation amount of each of the plurality of light beams received by the light receiver 120. A voltage level generated by the light receiver 120 is changed according to an amount of received light and, thus, the first processor 130 may determine a coordinate corresponding to a position of a light receiving device, on which a touch input is performed, based on a voltage level variation amount of each of the plurality of light receiving devices included in the light receiver 120.

The first processor 130 may scan optical input of the plurality of light receiving devices of the light receiver 120 for each preset period. The first processor 130 may determine a light receiving device from which a variation amount (e.g., a voltage level variation amount of a PD) of a preset level or more among the plurality of light receiving devices as a light receiving device to which an optical input is not performed.

The first processor 130 may calculate horizontal (X axis) and vertical (Y axis) coordinates on which a user touch input is performed, from a position of the light receiving device determined as a light receiving device in which an optical input is not performed. In addition, the first processor 130 may transmit the determined touch input coordinate to the second processor 140.

The first processor 130 may be embodied as a plurality of chips. For example, as illustrated in FIG. 4, the first processor 130 may be configured to be divided into a scanner 131 that performs a function of scanning an optical input of the plurality of light receiving devices for each preset period and a touch controller 133 that performs a function of calculating a touch input coordinate.

According to an exemplary embodiment of the present disclosure, the first processor 130 may suspend determination of a touch input coordinate upon detecting an optical change only from a light receiving device of the light receiver 120, which is positioned to corresponding to one of two directions in which the light emitter 110 emits light for preset one hour. The preset one hour may be a time for scanning an optical input of the light receiver 120. For example, when a scan frequency is 100 Hz, a scan time may be determined as 10 ms.

In this case, a touch input may be determined to be detected only from one of two axes, horizontal and vertical axes and, thus, in the specification, the term "one axis input" or "one axis state" will be used.

When an upper region on the display 160 is normally touched, an optical change may be detected both in horizontal and vertical directions within preset one hour. On the other hand, one axis input may occur when a user touches a reflective surface of the light guider 170 and FTIR occurs to cause an optical change. As another example, one axis input may occur when emitted light is hidden without user intention. In the case of the one axis input, the first processor 130 may suspend a touch input coordination determination operation itself or a touch input coordinate is determined but the determined coordinate may not be transmitted to the second processor 140. Alternatively, in the case of the one axis input, the second processor 140 may disregard the determined coordinate.

According to an exemplary embodiment of the present disclosure, upon determining that a touch input is determined as one axis input and postponing determination of a touch input coordinate, the first processor 130 may disregard an touch input that is performed before a preset second time elapses. That is, the first processor 130 may suspend determination of a touch input coordinate even if a change in light emitted in a different direction from one direction in which an optical change is detected (even if a touch input is detected from both axes) before preset second time elapses while determination of a touch input coordinate is suspended.

As a representative example in which FTIR occurs, a user may perform a manipulation such as tilt or pivot on the display 160. Even if a user simultaneously grasps a horizontal edge portion and a vertical edge portion of the display 160 while manipulating the display 160, it may be difficult to detect an optical change in both horizontal and vertical directions within preset first time. This is because the preset first time may be shorter than a difference between a first touch and a second touch that are sequentially performed by a user manipulation operation.

However, there may be the possibility that the first processor 130 incorrectly determines a normal touch input but not one axis input from a time point in which a touch on a horizontal edge portion and a vertical edge portion are completed. Accordingly, the second time longer than a time taken for manipulation may be set, and even if the first processor 130 detects a touch input from both two axes, the first processor 130 may suspend determination of a touch input coordinate before the preset second time elapses after one axis input. For example, when it is seen that 700 ms to 1300 ms is taken for user tilt or pivot manipulation as an experiment result, the second time may be set to 1500 ms that is longer than the second time.

Upon detecting an optical change only in one direction within the preset first time, the first processor 130 may notify the second processor 140 of the one axis input state.

The second processor 140 may control the display 160 and the image former 150 using the touch input coordinate determined by the first processor 130.

When an optical change in one direction, which causes the one axis input state, is maintained until a preset third time elapses after the second processor 140 is notified by the first processor 130 about the one axis input state, the second processor 140 may control the display 160 to display an error message. For example, the error message may be embodied in the form of a text or graphic such as "Optical path is hidden" and "Do not touch the edge with the hand". The second processor 140 may generate a voice signal, a visual signal, and so on and transmit an error message indicating that it is not possible to determine a touch input, to a user.

The image former 150 may form an image. For example, the image former 150 may include four photoconductive drums prepared to correspond to four colors of yellow, cyan, magenta, and black, an exposure device for scanning light to each photoconductive drum to form an electrostatic latent image of a desired image, a developing device for developing the electrostatic latent image using developers for the respective colors, and an image forming medium (a transfer belt or an intermediate transfer belt) for sequentially receiving overlapping and transferred images that are developed on the respective photoconductive drums, forming an image with a complete color and, then, transferring the image on a paper sheet.

The display 160 may display a user interface (UI) for controlling the image former 150. When the display 160 is embodied as a separate display apparatus (not shown) separated from the image former 150, the display 160 may display a UI for controlling the display apparatus (not shown).

A method of embodying the display 160 is not limited and, for example, the display 160 may be embodied in various types of displays such as a liquid crystal display (LCD), an organic light emitting diode (OLED), an active-matrix organic light-emitting diode (AMOLED), and a plasma display panel (PDP). The display 160 may further include additional components according to a method of embodying the display 160. For example, when the display 160 uses a liquid crystal method, the display 160 may include an LCD display panel (not shown), a backlight unit (not shown) for supplying light to the LCD display panel, and a panel driving substrate (not shown) for driving a panel (not shown).

The light guider 170 may receive and emit light emitted from the light emitter 110, receive the emitted light, and emit the light to the light receiver 120. Arrangement of the light guider 170 will be described with reference to FIG. 3. As illustrated in FIG. 3, the light guider 170 may form an outer appearance as well as perform a function of guiding light.

Referring to FIG. 3, the light guider 170 may be disposed on a lateral surface of the display 160. The light emitter 110 may be disposed below the display 160 and may emit light. The light guider 170 may receive light emitted from the light emitter 110 and emit the light to an upper portion of the display 160.

The light guider 170 may receive light emitted to the upper portion of the display 160 and emit the light to the light receiver 120. The light receiver 120 may be disposed below the display 160 and receive light that is emitted by the light guider 170.

The light guider 170 may include a plurality of reflective surfaces for changing an optical path so as to emit light emitted from a light emitter in horizontal and vertical directions. The light guider 170 may emit the light received by the upper portion of the display 160 to the light receiver 120 below the display 160 through the plurality of reflective surfaces.

The cover portion 180 may be spaced apart from at least one of the plurality of reflective surfaces of the light guider 170 so as to cover an external portion of the light guider 170. A detailed embodiment of the cover portion 180 will be described with reference to FIGS. 9A and 9B.

FIG. 4 is a diagram illustrating components of the image forming apparatus 100 in terms of components related to a touch input, according to an exemplary embodiment of the present disclosure. FIG. 4 illustrates the light emitter 110 including a plurality of LEDs, the light receiver 120 including a plurality of PDs, the first processor 130 in which the scanner 131 and the touch controller 133 are embodied as separate chips, and the second processor 140. FIG. 4 illustrates a connection method between chips included in the first processor 130 and the second processor 140. For example, the first processor 130 and the second processor 140 may be connected to each other and communicate with each other using at least one of INT, a serial peripheral interface (SPI)/PC, a universal asynchronous serial receiver and transmitter (UART), and a universal serial bus (USB).

In order to cover an entire region of a surface of the display 160, the light emitter 110 may emit light to a plurality of light receiving devices (PDs) from one light emitting device (LED) using a lens. For this reason, like in an example illustrated in FIG. 4, the number (43) of PDs of the light receiver 120 may be greater than the number (41) of LEDs of the light emitter 110.

A detailed description of the components illustrated in FIG. 4 is the same as the detailed description of FIG. 2 and, thus, will be omitted here.

FIGS. 5A to 5C are diagrams for explanation of a method of preventing a touch malfunction according to an exemplary embodiment of the present disclosure.

FIG. 5A is a diagram illustrating touch processing when a normal touch input is performed. In the exemplary embodiment illustrated in FIG. 5A, a scan time corresponding to the preset first time may be set to 5.4 ms. In a second cycle of FIG. 5A, when reduction in an amount of received light is detected in a device corresponding to a coordinate X1 among light receiving devices arranged in a horizontal direction (X axis) and a device corresponding to a coordinate Y1 among light receiving devices arranged in a vertical direction (Y axis), the first processor 130 may transmit information indicating that a touch input occurs at a coordinate (X1, Y1) to the second processor 140. The second processor 140 may control the display 160 to perform an operation of performing a touch input at a coordinate (X1, Y1) based on the received coordinate.

FIG. 5B is a diagram illustrating touch processing when a one axis input is detected. As illustrated in FIG. 5B, when reduction in an amount of received light is not detected in all light receiving devices arranged in a vertical direction (Y axis) and reduction in an amount of received light is detected only in a light receiving device corresponding to a coordinate X1 among light receiving devices arranged in a horizontal direction (X axis), the first processor 130 may suspend determination of a touch input coordinate. The first processor 130 may maintain suspension of determination of a touch input coordinate during preset second time (1500 ms in FIG. 5B) after the one axis input occurs.

Upon detecting an optical change only in one direction within a preset first time, the first processor 130 may notify the second processor 140 of the one axis input state. When the detected optical change in one direction is maintained (that is, when the one axis input state is maintained) until a preset third time elapses after being notified of the one axis input state, the second processor 140 may control the display 160 to display an error message. As illustrated in FIG. 5C, the error message may include at least one of a text and a graphic object.

When the one axis input state is released while the error message is displayed, the second processor 140 may control the display 160 to remove the error message.

According to an exemplary embodiment of the present disclosure, when reduction in an amount of received light is not detected in all light receiving devices of the light receiver 120 for a preset time after the one axis input state occurs, the first processor 130 may release the one axis input state and normalize a touch input. That is, the first processor 130 may release the state of suspending determination of a touch input coordinate and determine a user touch input coordinate based on a variation amount of each of a plurality of light beams received by the light receiver 120.

According to another exemplary embodiment of the present disclosure, after an optical change is detected only in any one of a horizontal direction (X axis) and a vertical direction (Y axis), when an optical change is also additionally detected in another direction, the first processor 130 may release the one axis input state and determine the touch input coordinate of the user.

FIGS. 6A to 6C are diagrams for explanation of a method of preventing a touch malfunction according to another exemplary embodiment of the present disclosure.

FIG. 6A is a diagram for explanation of an operation of manipulating the display 160 by a user. In general, when a user grasps the display 160 with the hand in order to manipulate the display 160, the user hand is gradually touched but not being simultaneously touched on a plurality of portions of an external portion of the display 160. For example, in FIG. 6A, after a portion ① is first touched by a thumb and, then, a portion ② is touched by an index finger.

As described above, the preset first time is shorter than a time taken for gradual touch of a user and, thus, the first processor 130 may determine the one axis input and suspend determination of a touch input coordinate in the case of FIG. 6A. However, when a scan frequency for determining the preset first time is a low value, there may also be the possibility that a touch input is determined to occur at a position of the display 160 corresponding to a Y coordinate of a portion ① and an X coordinate of a portion ② in the case of FIG. 6A.

FIGS. 6B and 6C illustrate the case in which a reflective surface of the light guider 170 outside the display 160 is gradually touched by a user at the same time interval as illustrated in FIG. 6A. In FIG. 6B, a scan frequency is set to 50 Hz and the first time is set to 20 ms. In FIG. 6C, a scan frequency is set to 185 Hz and the first time is set to 5.4 ms. In the case of FIG. 6B in which a scan frequency is relatively low, a malfunction occurs as if a normal touch is performed but, in the case of FIG. 6C in which a scan frequency is relatively high, the first processor 130 may determine the one axis input state and suspend determination of a touch input coordinate.

According to an exemplary embodiment of the present disclosure, when a touch state is an idle state, a scan frequency may be set to low in order to reduce power consumption. When a touch input is not performed for a predetermined time (that is, when an idle state is maintained for a predetermined time), the first processor 130 may set a scan frequency to be high. That is, the first processor 130 may set a scan time to be reduced. When the idle state is maintained for a predetermined time, the possibility that a touch input is performed is high and, thus, the first processor 130 may enhance a scan frequency in an idle state by as much as a scan frequency in an active state.

FIG. 7 is a diagram for explanation of restriction of a maximum size of an object according to an exemplary embodiment of the present disclosure. The first processor 130 may suspend determination of a touch input coordinate when a size of a range detected as a touch region is greater than an upper limit value of a preset size range. In the case of FIG. 7, when a dashed region detected as a touch region exceeds a size of a region with a side of 30 nm as a preset size range, the first processor 130 may suspend determination of a touch input coordinate with respect to the dashed region.

During a normal touch input, a user may use a finger, a pen, a stylus, and so on. On the other hand, when the user touches a reflective surface of the light guider 170 at an edge of the display 160 for manipulation of the display 160, a wider area may be touched than in the case in which the touch input is performed. For example, as illustrated in FIG. 7, when a touch region that exceeds a size of a region with a side of 30 mm is detected, an amount of received light may be determined to be reduced due to FTIR, but not a normal touch input. Accordingly, the first processor 130 may suspend determination of a touch input coordinate when a touch region greater than a preset size range is detected.

FIGS. 8A to 8D are diagrams for explanation of restriction of a minimum size of an object according to an exemplary embodiment of the present disclosure. The first processor 130 may suspend determination of a touch input coordinate when a size of a range detected as a touch region is smaller than a lower limit value of a preset size range.

When a user touches a reflective surface of the light guider 170 with the hand, the reduced amount of received light may be changed according to moisture content. FIG. 8A illustrates a variation amount of a reduced voltage level when a reflective surface is touched by the user hand if a voltage level of a photodetector (PD) of the light receiver 120 in a standby state (which is a state in which light emitted from the light emitter 110 is entirely received rather than being hidden) is 120. It may be seen that a variation level of a reduced voltage level is increased when moisture content in the user hand is increased.

Even if the reflective surface of the light guider 170 is touched by the user hand, the sensitivity of a light receiving device of the light receiver 120 may be adjusted so as to prevent a malfunction as if a touch input occurs. The sensitivity may be a threshold value of a reduced degree to be determined as a touch input compared with an amount of received light in a standby state. Referring to FIG. 8A, when sensitivity is set to a variation amount of 75% or more, even if a reflective surface is touched by the human with high moisture content, the first processor 130 may not determine that a touch input occur so as to prevent a malfunction.

As illustrated in FIG. 8B, there may be a correlation between sensitivity and a minimum object size for detecting a touch input. In the case of high sensitivity, a minimum size of an object from which a touch input is detected may be reduced. The case in which an amount of received light or a variation amount of a voltage level is set to be low may correspond to the case in which sensitivity is set to be high.

For example, when sensitivity is set to the case in which a variation amount is 75% or more, the first processor 130 may not detect the case in which a touch input is performed on an object with a size of 8 mm or less, as a touch input and, thus, may not determine a touch input coordinate. As such, when sensitivity is changed in order to prevent a malfunction, a trade-off relation in which a touch input is not capable of being performed with a slim inputter may be satisfied. Accordingly, there is a need to set sensitivity according to each user.

The second processor 140 may control the display 160 to display a user interface (UI) for setting a value corresponding to a lower limit value of a preset size range. For example, the value corresponding to the lower limit value may be sensitivity. FIGS. 8C and 8D are diagrams illustrating an example of a UI for setting sensitivity. FIG. 8C illustrates an example of a UI containing a menu for enhancing touch sensitivity in a lowermost end. FIG. 8D is a diagram illustrating an example of a UI for setting through three steps.

FIGS. 9A and 9B are diagrams for explanation of a shape of the cover portion 180 according to diverse exemplary embodiments of the present disclosure.

The light guider 170 may include a plurality of reflective surfaces for changing an optical path at lower and upper ends of the display 160. A touch malfunction due to FTIR may be caused by touching a reflective surface of the light guider 170 and, in this regard, the cover portion 180 may be disposed to cover an external portion of the reflective surface of the light guider 170.

The cover portion 180 may be spaced apart from a plurality of reflective surfaces. This is because TIR occurs when an air gap is present between the cover portion 180 and the reflective surface. However, TIR occurs when the cover portion 180 and the reflective surface contact each other according to a pressure during usage. Compared with the case in which the cover portion 180 and the reflective surface are closely positioned, the cover portion 180 may be formed of a material with lower density than a material for forming the light guider 170. When density is low, a refractive index is also low and, thus, reduction in an amount of received light due to FTIR may be minimized.

As illustrated in FIG. 9A, the cover portion 180 may be spaced apart from a reflective surface positioned at a lower end of the display 160 by a predetermined distance so as to cover only the reflective surface. FIG. 9A illustrates an exemplary embodiment obtained by considering that a user frequently touches a lower end of the display 160 in order to prevent obstruction in watching of an image displayed on the display 160.

As another example, the cover portion 180 may be embodied to cover a reflective surface positioned at an upper end of the display 160 as well as a reflective surface positioned at a lower end of the display 160, as illustrated in FIG. 9B.

FIG. 10 is a diagram for explanation of components of the touch input apparatus 200 according to an exemplary embodiment of the present disclosure. As described above, the image former 150 may be separated from the image forming apparatus 100 according to an exemplary embodiment of the present disclosure to be embodied in the form of an independent display apparatus (not shown). The touch input apparatus 200 may also be embodied by separating the display 160 from a display apparatus (not shown) so as to receive only a touch input.

Referring to FIG. 10, the touch input apparatus 200 may include a light emitter 210, a light receiver 220, and a processor 230. The touch input apparatus 200 may further include a light guider (not shown) and a cover portion (not shown).

A detailed description of the light emitter 210, the light receiver 220, the processor 230, the light guider (not shown), and the cover portion (not shown) of the touch input apparatus 200 has been given with regard to the image forming apparatus 100 의 the light emitter 110, the light receiver 120, the first processor 130, the light guider 170, and the cover portion 180 and, thus, will be omitted here.

FIGS. 11 and 12 are flowcharts for explanation of a method of preventing touch error according to diverse exemplary embodiments of the present disclosure. For example, the method of preventing touch error may be performed by the image forming apparatus 100, a display apparatus (not shown), and the touch input apparatus 200 according to an exemplary embodiment of the present disclosure. Hereinafter, embodiments of the present disclosure will be described with reference to FIGS. 11 and 12 in terms of the case in which the method is performed by the image forming apparatus 100.

FIG. 11 is a flowchart for explanation of a method of preventing touch error according to an exemplary embodiment of the present disclosure. Referring to FIG. 11, the image forming apparatus 100 may emit a plurality of light beams in a first direction perpendicular to a light emitting direction of a display and a second perpendicular to the light emitting direction and the first direction (S1110). In addition, the image forming apparatus 100 may receive the emitted light (S1120).

Then, the image forming apparatus 100 may determine a variation amount of each of the received light beams (S1130). Upon detecting change in light beams emitted in the first direction and the second direction within a preset first time (S1140-N), the image forming apparatus 100 may determine a current touch input as a normal touch input and determine a touch input coordinate (S1150).

On the other hand, in the case of a one axis input state in which optical change is detected only in one direction within the preset first time (S1140-Y), the image forming apparatus 100 may suspend determination of a touch input coordinate.

FIG. 12 is a flowchart for explanation of a method of preventing touch error according to another exemplary embodiment of the present disclosure. In order to prevent a repeated description in FIG. 12, light emitting and light receiving procedures and so on will be omitted and a description will be begun after a one axis input state occurs.

When the one axis input state occurs (S1210), the image forming apparatus 100 may suspend determination of a touch input coordinate (S1220). Even if change in light emitted in a different direction from a direction for detection of light is detected before a preset second time elapses while determination of a touch input coordinate is suspended, the image forming apparatus 100 may maintain suspension of a touch input coordinate.

When a one axis input is maintained (that is, when detected optical change in one direction is maintained) until a preset third time elapses while determination of a touch input coordinate is suspended (S1230-Y), the image forming apparatus 100 may display an error message (S1240). The error message may include a text and a graphic object, indicating that touch error due to one axis input occurs.

When the one axis input state is released during suspension of a touch input coordinate (S1250-Y and S1270-Y), the image forming apparatus 100 may remove the displayed error message (S1260). In order to prevent a repeated description, the case in which the one axis input state is released will be omitted here.

Descriptions of other methods of preventing touch error according to diverse exemplary embodiments of the present disclosure have been given with regard to the image forming apparatus 100 according to the aforementioned embodiments and, thus, will be omitted here.

According to the aforementioned image forming apparatus 100, display apparatus (not shown), touch input apparatus 200, and method of preventing touch error, unintended touch input caused by touching a reflective surface of a light guider used as an external portion may be prevented.

Embodiments of the present disclosure can include a computer readable medium including program commands for executing operations implemented through various computers. The computer readable medium can store program commands, data files, data structures or combinations thereof. The program commands recorded in the medium may be specially designed and configured for the present disclosure or be known to those skilled in the field of computer software. Examples of a computer readable recording medium include magnetic media such as hard discs, floppy discs and magnetic tapes, optical media such as CD-ROMs and DVDs, magneto-optical media such as floptical discs, or hardware devices such as ROMs, RAMs and flash memories, which are specially configured to store and execute program commands. Examples of the program commands include a machine language code created by a compiler and a high-level language code executable by a computer using an interpreter and the like. The hardware device may be operated as one or more software modules in order to perform an operation according to the present disclosure or vice versa.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

The invention claimed is:

1. An image forming apparatus comprising:
   an image former;
   a display to display a user interface (UI) for controlling the image former;
   a light emitter to emit a plurality of light beams in a first direction perpendicular to a light emitting direction of the display and a second direction perpendicular to the first direction and the light emitting direction;
   a light receiver to receive the plurality of light beams emitted from the light emitter;
   a first processor to determine a touch input coordinate of a user based on a variation amount of each of the plurality of light beams received by the light receiver; and
   a second processor to control the display and the image former using the determined touch input coordinate,
   wherein the first processor suspends determination of a touch input coordinate in response to optical change being detected only in one direction within a preset first time.

2. The image forming apparatus as claimed in claim 1, wherein the first processor determines a touch input coordinate in response to change in light emitted in a different direction within the preset first time being detected while change in light emitted in one direction is detected and suspends determination of a touch input coordinate in response to change in light emitted in the different direction being detected after the preset first time.

3. The image forming apparatus as claimed in claim 1, wherein the first processor maintains suspension of determination of a touch input coordinate despite detection of change in light emitted in a different direction from one direction in which the optical change is detected before a preset second time elapses while determination of a touch input coordinate is suspended.

4. The image forming apparatus as claimed in claim 1, wherein the first processor notifies the second processor of a one axis input state in response to optical change being detected only in one direction within the preset first time.

5. The image forming apparatus as claimed in claim 4, wherein the second processor controls the display to display an error message when the detected optical change in one direction is maintained until a preset third time elapses after being notified of the one axis input state.

6. The image forming apparatus as claimed in claim 1, wherein the light receiver comprises:
a plurality of first sensors to receive light emitted in the first direction; and
a plurality of second sensors to receive light emitted in the second direction.

7. The image forming apparatus as claimed in claim 6, wherein the first processor detects a sensor with a variation amount of a received light value of a preset level or more as a sensor for detecting a touch input among the plurality of first sensors and the plurality of second sensors and determines a touch input coordinate of the user based on an arrangement position of the detected sensor.

8. The image forming apparatus as claimed in claim 1, wherein the first processor suspends determination of a touch input coordinate when a size of a range detected as a touch region deviates from a preset size range.

9. The image forming apparatus as claimed in claim 8, wherein the second processor controls the display to display a UI for setting a value corresponding to a lower limit value of the preset size range.

10. The image forming apparatus as claimed in claim 1, further comprising a light guider disposed on a lateral surface of the display,
wherein:
the light emitter is disposed below the display;
the light receiver is disposed below the display; and
the light guider receives light emitted from the light emitter, emits the light to an upper portion of the display, receives the emitted light to the upper portion of the display, and emits the light to the light receiver.

11. The image forming apparatus as claimed in claim 10, wherein the light guider comprises a plurality of reflective surfaces for changing an optical path so as to emit the light emitted from the light emitter in the first direction and the second direction.

12. The image forming apparatus as claimed in claim 11, further comprising a cover portion to cover at least one external portion of the plurality of reflective surfaces,
wherein the cover portion is spaced apart from at least one of the plurality of reflective surfaces.

13. The image forming apparatus as claimed in claim 12, wherein the cover portion comprises a material with lower density than a material of the light guider.

14. A touch input apparatus comprising:
a light emitter to emit a plurality of light beams in a preset first direction and a second direction perpendicular to the first direction;
a light receiver to receive the plurality of light beams emitted from the light emitter; and
a processor to determine a touch input coordinate of a user based on a variation amount of each of the plurality of light beams received by the light receiver,
wherein the processor determines a touch input coordinate in response to change in light emitted in the first direction and the second direction being detected within a preset first time and suspends determination of a touch input coordinate in response to optical change being detected only in one direction within the preset first time.

15. The touch input apparatus as claimed in claim 14, wherein the processor maintains suspension of determination of a touch input coordinate despite detection of change in light emitted in a different direction from one direction in which the optical change is detected before a preset second time elapses while determination of a touch input coordinate is suspended.

* * * * *